Figure 20:
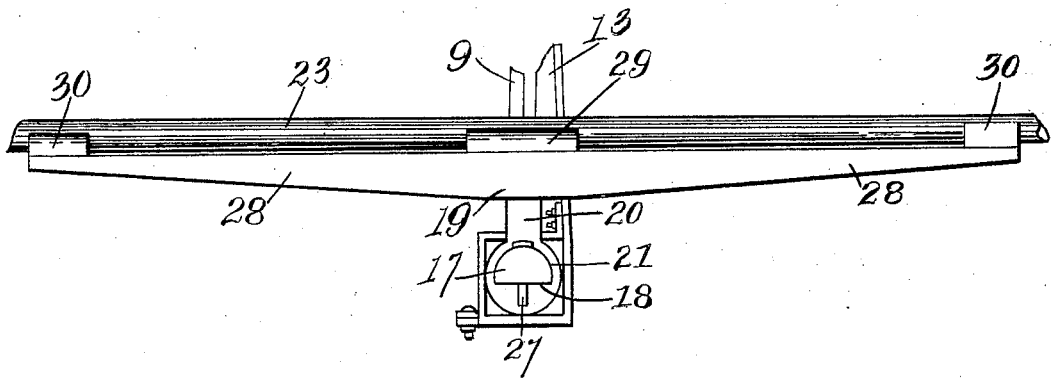

No. 831,302. PATENTED SEPT. 18, 1906.
G. G. SCHROEDER.
AERIAL ELECTRIC TRACKWAY.
APPLICATION FILED MAY 29, 1906.
7 SHEETS—SHEET 1.
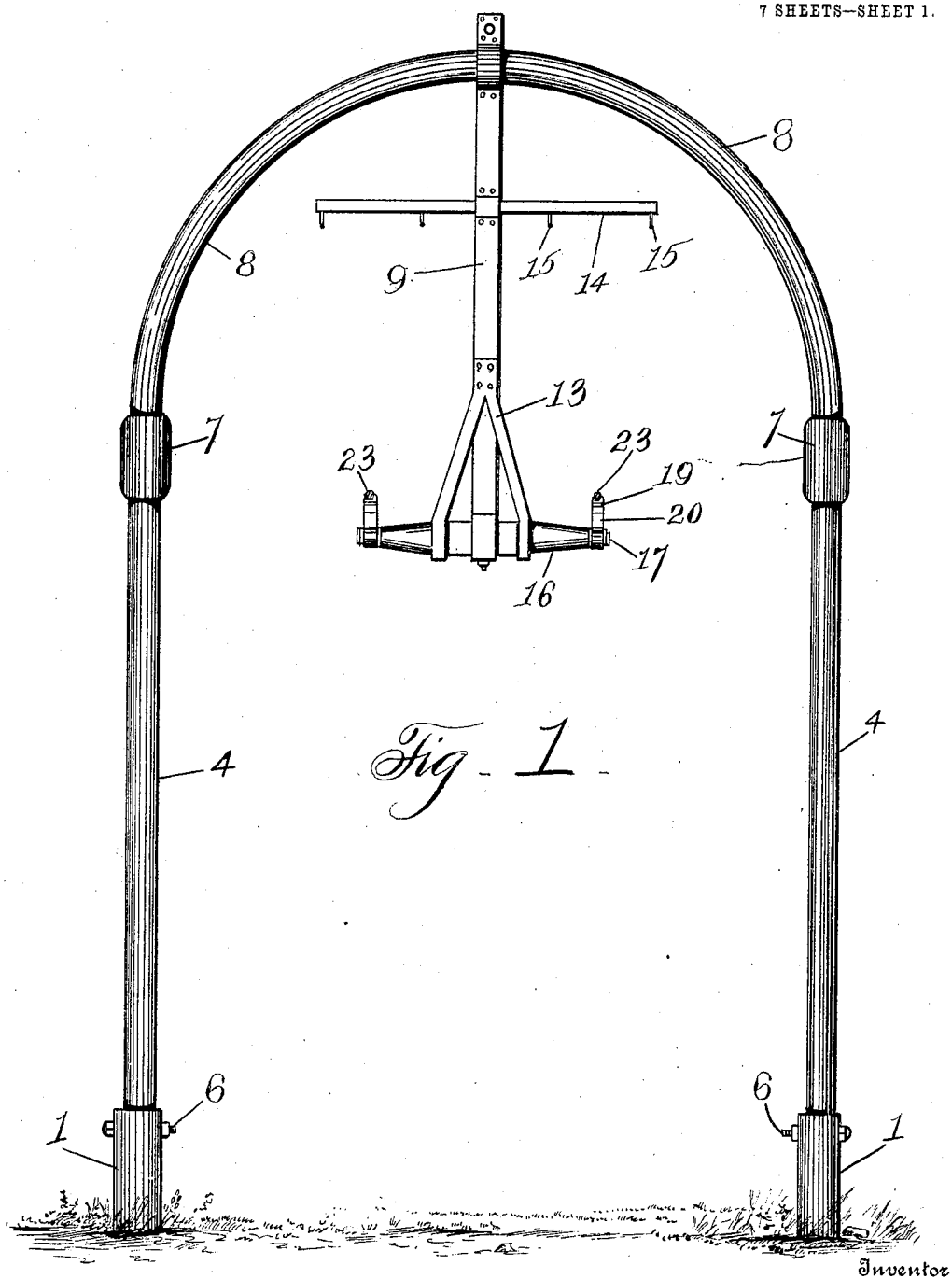

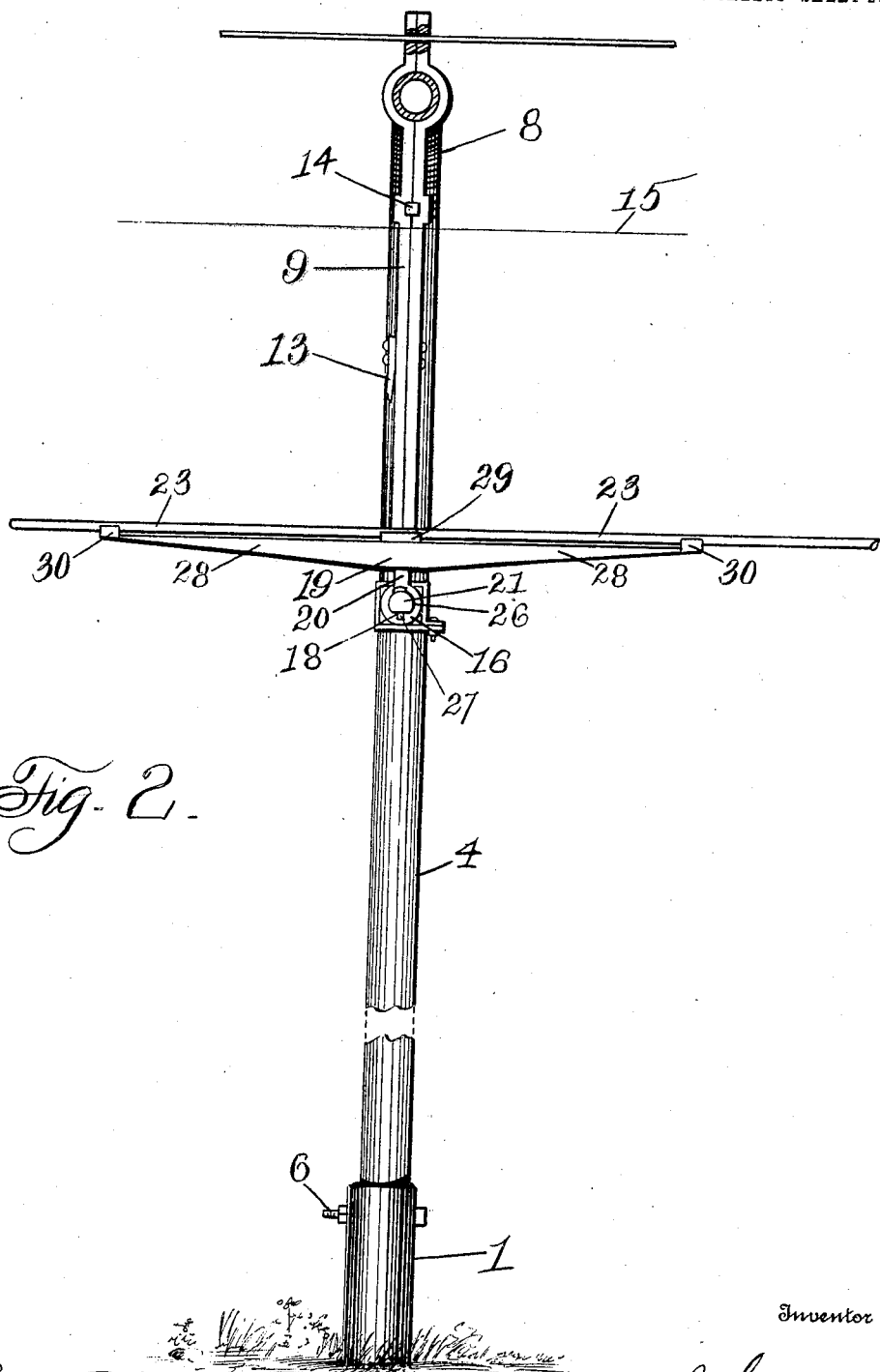

No. 831,302. PATENTED SEPT. 18, 1906.
G. G. SCHROEDER.
AERIAL ELECTRIC TRACKWAY.
APPLICATION FILED MAY 29, 1906.
7 SHEETS—SHEET 3.
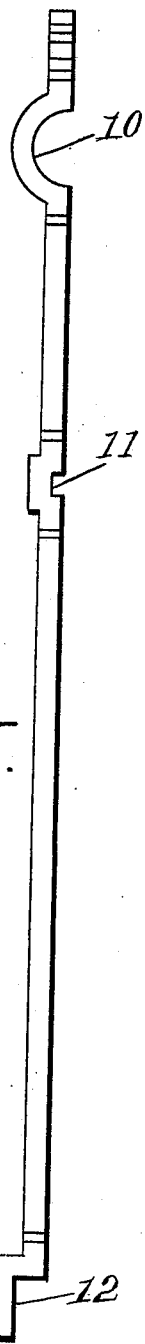
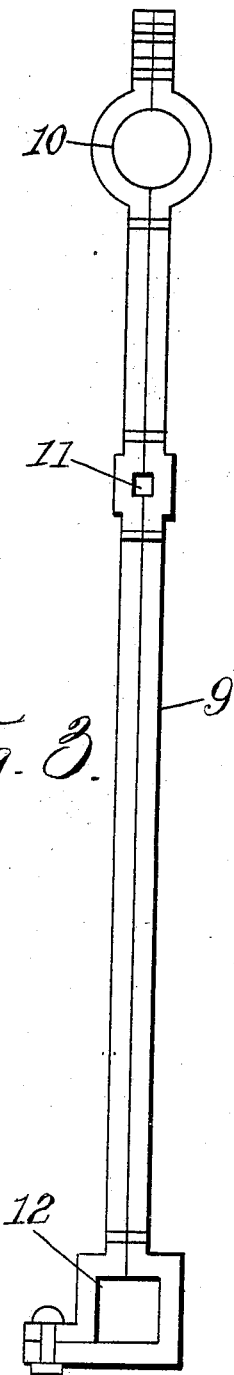

No. 831,302. PATENTED SEPT. 18, 1906.
G. G. SCHROEDER.
AERIAL ELECTRIC TRACKWAY.
APPLICATION FILED MAY 29, 1906.
7 SHEETS—SHEET 4.
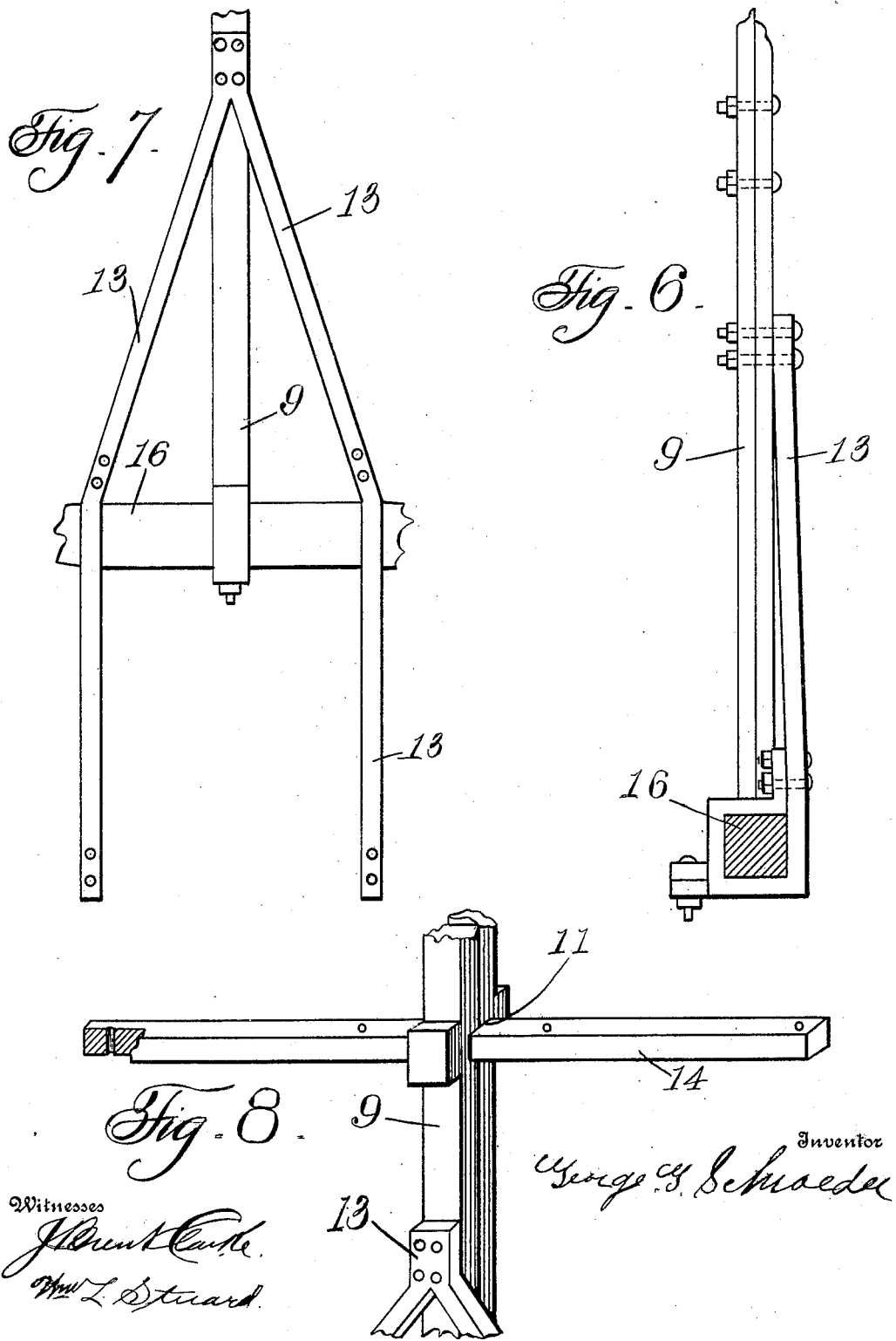

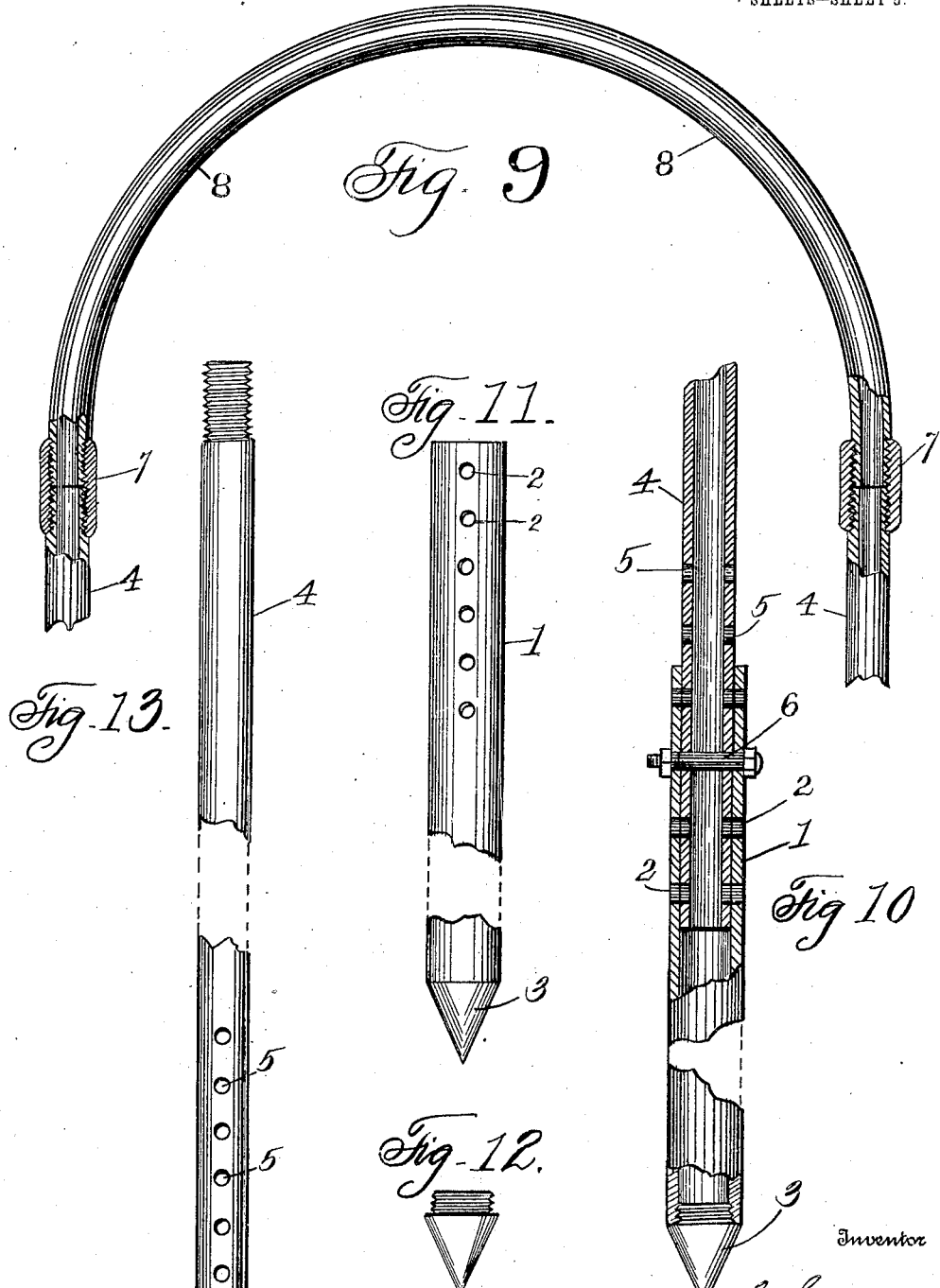

No. 831,302. PATENTED SEPT. 18, 1906.
G. G. SCHROEDER.
AERIAL ELECTRIC TRACKWAY.
APPLICATION FILED MAY 29, 1906.
7 SHEETS—SHEET 6.
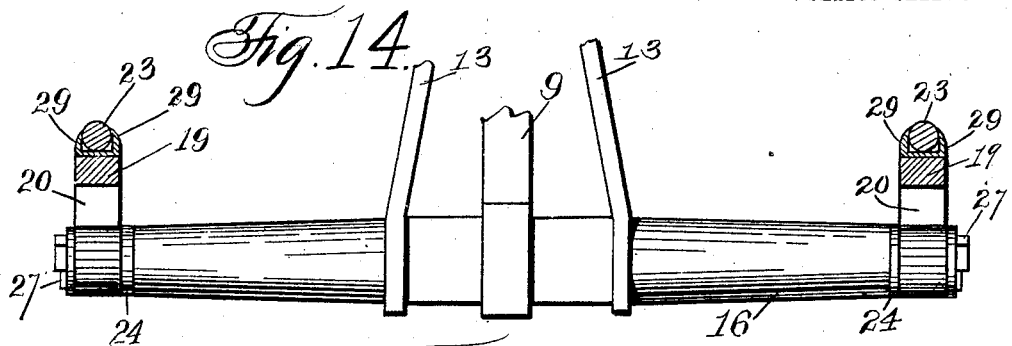
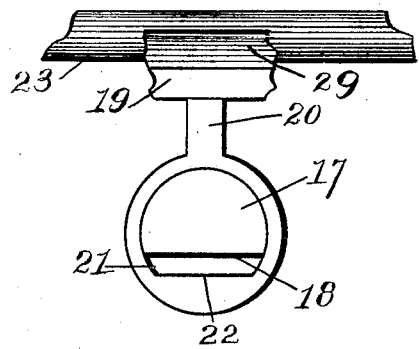
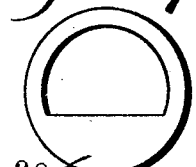
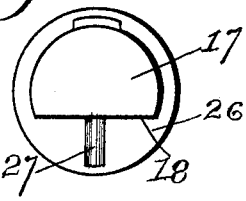
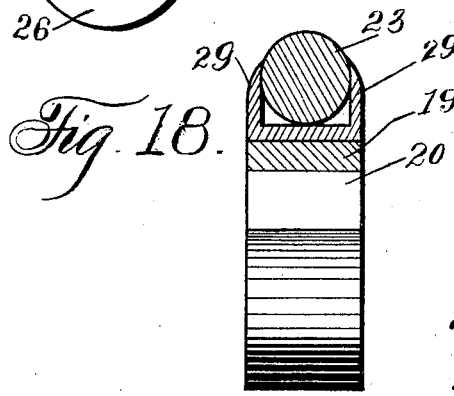
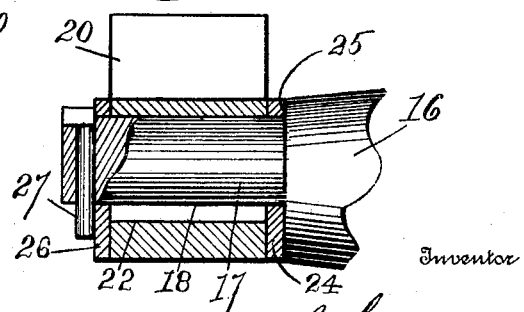
Witnesses
J Brent Clarke
Wm L Stuard
Inventor
George G. Schroeder No. 831,302. PATENTED SEPT. 18, 1906.
G. G. SCHROEDER.
AERIAL ELECTRIC TRACKWAY.
APPLICATION FILED MAY 29, 1906.

7 SHEETS—SHEET 7.

Witnesses
J Brent Clarke
Wm L Stuard

Inventor
George G. Schroeder

UNITED STATES PATENT OFFICE.

GEORGE G. SCHROEDER, OF WASHINGTON, DISTRICT OF COLUMBIA, ASSIGNOR TO INDUSTRIAL MOTOR COMPANY, A CORPORATION OF THE DISTRICT OF COLUMBIA.

AERIAL ELECTRIC TRACKWAY.

No. 831,302.  Specification of Letters Patent.  Patented Sept. 18, 1906.

Application filed May 29, 1906. Serial No. 319,343.

*To all whom it may concern:*

Be it known that I, GEORGE G. SCHROEDER, a citizen of the United States, residing at Washington, in the District of Columbia, have invented certain new and useful Improvements in Aerial Electric Trackways, of which the following is a specification.

This invention has relation to aerial electric trackways; and it consists in the novel construction and arrangement of its parts, as hereinafter shown and described.

The object of the invention is to provide an aerial trackway and support for the same which is adapted to be used by electrically-propelled cars or motors for transportation purposes.

The invention consists primarily of uprights suitably secured at their lower ends in the ground. An arch member connects the upper ends of said uprights together. A hanger depends from the center of the arch and is provided with a current-wire-supporting arm and a track-supporting yard-arm. A spring-bolster of special construction is interposed between the track and the yard-arm. Said bolster is permitted to have a limited oscillatory movement in the line of the track. The track, which is preferably a cable, is retained vertically between flanges of the bolster located at its middle and at its ends, but is capable of longitudinal movement therein. Thus the slack in the cable incident to contraction and expansion thereof may be taken up throughout the entire length of the track. The spring-bolster is of greatest thickness vertically and gradually diminishes in such thickness toward its ends. The ends of the bolster extend along the track. The spring tension of the bolster is greatest at its middle and gradually diminishes toward the ends. The object of this is to ease a car or motor along the track and over the yard-arm in such a manner as to prevent precipitous section forming in the track at such points caused by the weight of the motor and its momentum—that is to say, that as the motor approaches the bolster the same tilts down toward the approaching motor. When the limit of such tilt is reached, the spring tension of the bolster comes into play and permits further depression of the track. At the same time the bolster maintains the track at a gentle incline as the motor passes over the same, thus preventing the track from buckling or assuming precipitous sections at the point of support. Thus the possibility of the motor jumping the track from such cause is removed.

Figure 21:
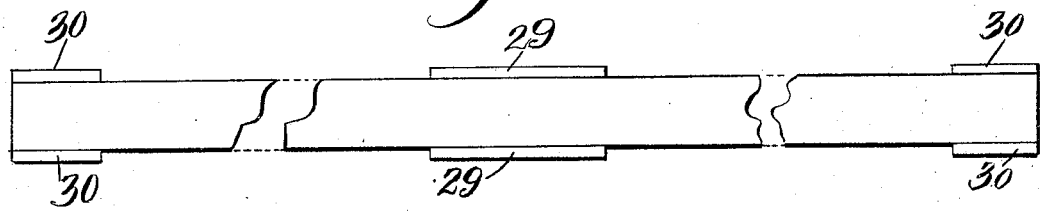
Figure 22:
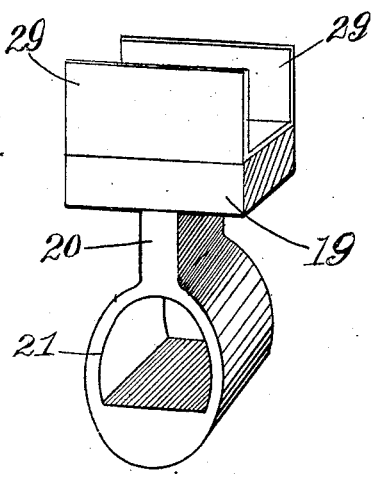

In the accompanying drawings, Figure 1 is a side elevation of the track-supporting uprights and attachments. Fig. 2 is a transverse sectional view of the same. Fig. 3 is an edge elevation of the track-hanger. Fig. 4 is an edge elevation of one of the track-hanger members. Fig. 5 is an edge elevation of the other track-hanger member. Fig. 6 is an edge elevation of a portion of the track-hanger and brace. Fig. 7 is a side elevation of a modified form of hanger. Fig. 8 is a perspective view of an intermediate portion of track-hanger. Fig. 9 is a side elevation of the arch member. Fig. 10 is a side elevation, partly in section, of the lower portion of the upright in sleeve. Fig. 11 is a side elevation of sleeve. Fig. 12 is a side elevation of sleeve end point. Fig. 13 is a side elevation of lower end of upright. Fig. 14 is a side elevation of the yard-arm. Fig. 15 is an end elevation of the yard-arm in the bolster-shank. Fig. 16 is an end elevation of the yard-arm in the bolster-shank with washer and pin in position. Fig. 17 is a side elevation of the washer. Fig. 18 is a transverse section of the track in the bolster. Fig. 19 is a side elevation of the end of the yard-arm, showing the bolster-shank in section. Fig. 20 is a side elevation of the bolster and attachments. Fig. 21 is a top plan view of the bolster. Fig. 22 is a perspective view of the intermediate portion of the bolster.

The sleeves 1 1 are adapted to be driven or otherwise placed in the ground. Said sleeves are provided with the series of side perforations 2 2. The lower ends of the sleeves are closed by the screw-threaded points 3 3. The lower ends of the uprights 4 4 fit in the upper ends of the sleeves 1 1. Said uprights are provided with the perforations 5. The bolts 6 6 pass through the perforations 2 and 5 and secure the uprights 4 in proper elevation within the sleeves 1. The unions 7 7 are screwed upon the upper ends of the uprights 4 4 and the ends of the arch member 8 are screwed into said unions. Thus the upper ends of the uprights 1 1 are secured together. The hanger 9 depends from the center of the arch 8. Said hanger consists of two members, which are bolted together and are provided with the arch-receiving space 10, wire-supporting arm-space 11, and yard-arm space 12. Suitable braces, as 13, may be provided, as desired. The arm 14 is located in the spaces 10 between the hanger members. The current-wires 15 15 are supported in parallel relation by the said arm 14. The yard-arm 16 is located in the spaces 12 between the hanger members. The trunnions 17 17 are formed at the ends of the yard-arm 16. Said trunnions are provided with the flattened under sides 18. The bolster 19 is provided at its middle with the depending shank 20, which is provided with a perforation 21, which receives the trunnion 17. Said perforation is provided with the flattened side 22, which is spaced from the flat side 18 of the said trunnion. Thus the said trunnion-shank and its attachments is permitted to have a slight limited oscillatory movement on the trunnion 17. Said movement is in the line of the track 23. The washer 24 is interposed between the rear edge of the shank 20 and the shoulder 25 on the yard-arm 16. The washer 26 fits on the outer end of the trunnion 17 and closes the outer end of the space between the flattened side of the trunnion and the flattened side 22 of the perforation 21. The linchpin 27 passes vertically through the perforation provided at the end of the trunnion 17 and holds the parts in place.

The bolster 19 is provided with the extended ends 28 28, passing under the track 23. Said bolster 19 is thickest vertically at its middle and gradually decreases in vertical thickness toward the ends. The middle of the upper edges of the bolster 19 is provided with the parallel flanges which extend up just beyond the diameter of the track 23. The upper edges of the said flanges fit snugly against the sides of the track 23 and retain the same vertically, but permit longitudinal movement of the same. The ends of the bolster 19 are provided with similar flanges 30 30, which receive the track 23 and retain the same in similar manner and permit similar longitudinal movement of the track. It will thus be seen that while the track 23 is retained vertically it is permitted to move longitudinally over the bolster 19, and thus the slack that may occur in the said track may be taken up. The bolster 19 is made of spring metal, and consequently when the motor or car (not shown) passes over the said bolster the same gives comparatively easily against the weight of the motor at the ends, but gradually resists the weight thereof as the motor approaches the middle of the said bolster. Thus the track 23 is not permitted to present precipitous section to the approach of the motor at the track-supports, and the said motor passes over inclines at the supports that are gradual. By this arrangement the motor is prevented from jumping the track at the track-supports, and the trolley-wheels carried by the motor are maintained in proper contact with the current-wires 15 15. This is owing to the fact that the extended ends of the bolster 19 do not permit the track 23 under the weight of the motor to become depressed to too great an extent at the track-supports.

Having described my invention, what I claim as new, and desire to secure by Letters Patent, is—

1. A track-support consisting of uprights, an arch member connecting the upper ends of the uprights together, a hanger depending from said arch, a track supported by said hanger, a pivoted bolster interposed between the track and the hanger and means located at the pivotal point of the bolster for limiting its oscillatory movement.

2. A track-support consisting of uprights, an arch member connecting the upper ends of the uprights together, a hanger depending from said arch, a track supported by said hanger, a pivoted bolster interposed between the track and the hanger and means located at the pivotal point of the bolster for limiting its oscillatory movement in the line of the track.

3. A track-support consisting of uprights, an arch member connecting the upper ends of the uprights together, a hanger depending from said arch, a yard-arm extending laterally from said hanger, and a track supported upon said yard-arm.

4. A track-support consisting of uprights, an arch member connecting the upper ends of the uprights together, a hanger depending from said arch, a flexible track supported by said hanger and suitable current-wires also supported by said hanger vertically above the track.

5. A track-support consisting of uprights, an arch member connecting the upper ends of the uprights together, a hanger depending from said arch, a yard-arm extending laterally from said hanger, a track supported by said yard-arm, a second yard-arm supported by said hanger and current-wires supported by said second yard-arm.

6. A track-support consisting of uprights, an arch member connecting the upper ends of the uprights together, a hanger depending from said arch, a yard-arm extending laterally on each side of said hanger, tracks supported at the ends of said yard-arms, a second yard-arm supported by said hanger and extending on each side thereof, current-wires supported at each end of said second yard-arm.

7. A track-support consisting of uprights, an arch member connecting the upper ends of the uprights together, a hanger depending from said arch, a track supported by said hanger, a pivoted spring-bolster interposed between the track and the hanger and means located at the pivotal point of the bolster for limiting its oscillatory movement.

8. A track-support consisting of uprights, an arch member connecting the upper ends of the uprights together, a hanger depending from said arch, a flexible track supported by said hanger, a spring-bolster interposed between the track and the hanger and having a limited oscillatory movement in the line of the track.

9. A track-support, a track, a pivoted spring-bolster interposed between the track and the support and means located at the pivotal point of the bolster for limiting its oscillatory movement.

10. A track-support, a track, a pivoted spring-bolster interposed between the track and the support and means located at the pivotal point of the bolster for limiting its oscillatory movement in the line of the track.

11. A track-support, a track, a pivoted bolster interposed between the track and the support and means located at the pivotal point of the bolster for limiting its oscillatory movement.

12. A track-support, a track, a pivoted bolster interposed between the track and the support and means located at the pivotal point of the bolster for limiting its oscillatory movement in the line of the track.

13. A track-support, a track, a pivoted bolster interposed between the track and the support and adapted to retain the track vertically, but permitting longitudinal movement of the track, and means located at the pivotal point of the bolster for limiting its oscillatory movement.

14. A track-support, a track, a bolster interposed between the track and the support, said bolster having upturned flanges that terminate short of the circumference of the track, but retain the track vertically and permit longitudinal movement of the track.

15. A track-support, a track, a spring-bolster interposed between the track and the support, said bolster having upturned flanges that terminate short of the circumference of the track, but retain the track vertically and permit longitudinal movement of the track.

16. A track-support, a track, a bolster interposed between the track and the support, said bolster having its ends extending along the track and being provided with upturned intermediate flanges, and flanges at its ends which retain the track vertically, but permit longitudinal movement of the track.

17. A track-support, a track, a spring-bolster interposed between the track and the support, said bolster having its ends extending along the track, and being provided with upturned intermediate flanges, and at its end flanges which retain the track vertically, but permit longitudinal movement of the track.

18. A track-support, a track, a bolster interposed between the track and the support and having an oscillatory movement, said bolster having upturned flanges that terminate short of the circumference of the track, but retain the track vertically and permit longitudinal movement of the track.

19. A track-support, a track, a bolster interposed between the track and the support and having a limited oscillatory movement, said bolster having upturned flanges that terminate short of the circumference of the track, but retain the track vertically and permit longitudinal movement of the track.

20. A track-support, a track, a bolster interposed between the track and the support and having an oscillatory movement in the line of the track, said bolster having upturned flanges that terminate short of the circumference of the track, but retain the track vertically and permit longitudinal movement of the track.

21. A track-support, a track, a bolster interposed between the track and the support and having a limited oscillatory movement in the line of the track, said bolster having upturned flanges that terminate short of the circumference of the track, but retain the track vertically and permit longitudinal movement of the track.

22. A track-support, a track, a spring-bolster interposed between the track and the support and having an oscillatory movement, said bolster having upturned flanges that terminate short of the circumference of the track, but retain the track vertically and permit longitudinal movement of the track.

23. A track-support, a track, a spring-bolster interposed between the track and the support and having a limited oscillatory movement, said bolster having upturned flanges that terminate short of the circumference of the track, but retain the track vertically and permit longitudinal movement of the track.

24. A track-support, a track, a spring-bolster interposed between the track and the support and having an oscillatory movement in the line of the track, said bolster having upturned flanges that terminate short of the circumference of the track, but retain the track vertically and permit longitudinal movement of the track.

25. A track-support, a track, a spring-bolster interposed between the track and the support and having a limited oscillatory movement in the line of the track, said bolster having upturned flanges that terminate short of the circumference of the track, but retain the track vertically and permit longitudinal movement of the track.

In testimony whereof I have signed my name to this specification in the presence of two subscribing witnesses.

GEORGE G. SCHROEDER.

Witnesses:
 ANSON S. TAYLOR,
 WM. L. STUARD.